United States Patent [19]

Tietjen et al.

[11] 4,379,327
[45] Apr. 5, 1983

[54] UNIVERSAL INTERFACE CIRCUIT FOR SYNCHRONOUS AND ASYNCHRONOUS BUSES

[75] Inventors: Donald Tietjen; Sharon Lamb; Pern Shaw; Duane Cawthron; Paul D. Shannon, all of Austin, Tex.

[73] Assignee: Motorola, Inc., Schaumburg, Ill.

[21] Appl. No.: 170,481

[22] Filed: Jul. 21, 1980

[51] Int. Cl.³ .............................................. G06F 3/00
[52] U.S. Cl. ............................................... 364/200
[58] Field of Search ... 364/200 MS File, 900 MS File; 340/825.21; 375/118, 119, 106; 370/100; 307/269; 328/63

[56] References Cited
U.S. PATENT DOCUMENTS 3,999,163  12/1976  Levy et al. ..................... 364/200
4,215,243   7/1980  Maxwell ..................... 364/200 X

*Primary Examiner*—Raulfe B. Zache
*Attorney, Agent, or Firm*—Anthony J. Sarli, Jr.; Vincent B. Ingrassia; Jeffrey Van Myers

[57] ABSTRACT

A universal bus interface circuit can be used in conjunction with either synchronous or asynchronous bus systems. An input terminal is monitored to determine if the bus is synchronous or asynchronous. If the bus is asynchronous, a synchronization circuit generates a synchronous control signal for internal use from an asynchronous select signal. The synchronization circuit also generates an asynchronous hand-shake or acknowledge signal which is applied to the input terminal to indicate completion of the operation. The input terminal is monitored by a host processor.

7 Claims, 7 Drawing Figures

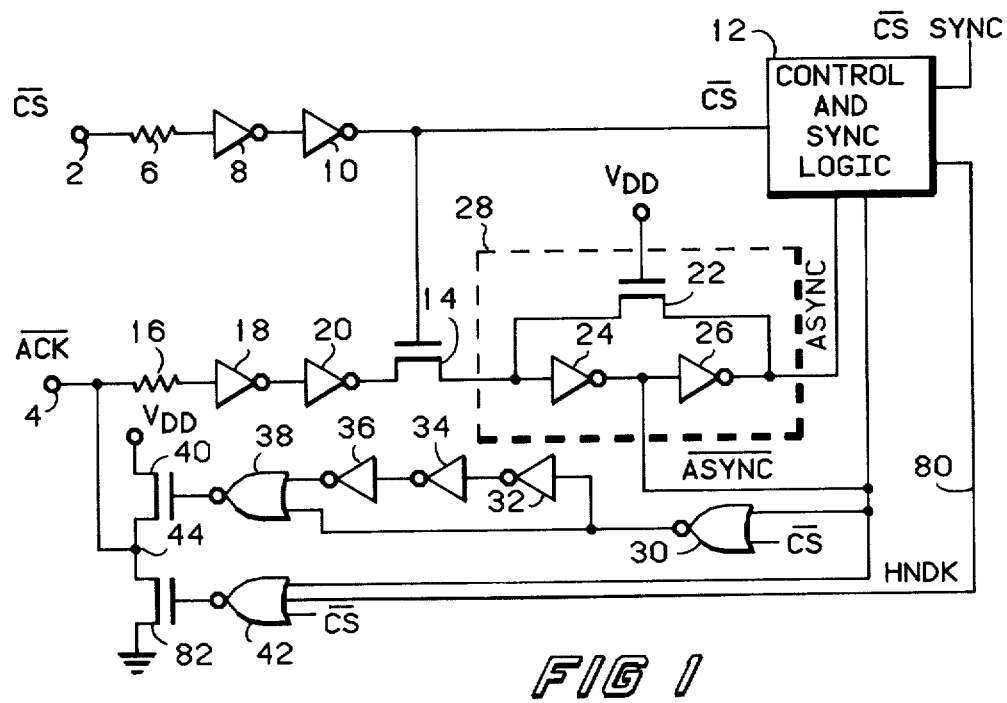
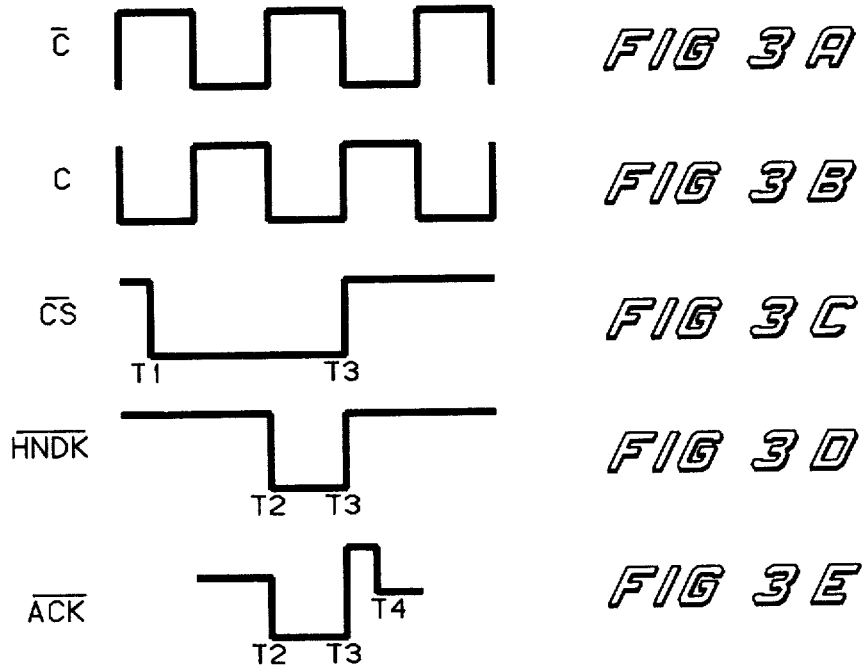
FIG 3A
FIG 3B
FIG 3C
FIG 3D
FIG 3E

UNIVERSAL INTERFACE CIRCUIT FOR SYNCHRONOUS AND ASYNCHRONOUS BUSES

BACKGROUND OF THE INVENTION

1. Field of the Invention

This invention relates generally to buffer circuits and, more particularly, to an interface circuit for use in conjunction with either a synchronous bus system or an asynchronous bus system.

2. Description of the Prior Art

Generally speaking, all signals within a local digital system are controlled by a local clock. Such a system is referred to as a synchronous system. However, when a synchronous system interfaces with a common bus (e.g. data, addresses, control signals, etc.), the bus may either be synchronized with the local clock signal or it may be asynchronous with respect to the local clock signal. If the bus is synchronous, then there are specific timing and phase requirements which must be met in order to complete a transfer operation. If the bus is asynchronous, it is usually necessary to synchronize all signals with the local clock signal. Furthermore, it is generally necessary that a handshake or acknowledge signal be generated at the end of a transfer operation to signify its completion. As a result of these requirements, different circuits are generally required to accommodate synchronous and asynchronous bus systems.

SUMMARY OF THE INVENTION

It is an object of the present invention to provide an improved bus interface circuit.

It is a further object of the present invention to provide a bus interface circuit for use with either synchronous or asynchronous buses.

It is a still further object of the invention to provide an improved bus interface circuit which senses whether the system to which it is coupled is synchronous or asynchronous.

Finally, it is an object of the invention to provide a bus interface circuit for both synchronous and asynchronous buses which includes a synchronization circuit for generating a synchronous control signal for internal use from an asynchronous chip select (CS) signal.

According to a first aspect of the invention there is provided an interface circuit for use in conjunction with a data processing system bus, comprising: first means coupled to said bus for receiving a select signal from said data processing system; second means for receiving an indication as to whether said bus is synchronous or asynchronous; third means for passing said select signal if said bus is synchronous; and fourth means coupled to said first and second means for synchronizing said select signal if said bus is asynchronous.

According to a further aspect of the invention there is provided an interface circuit for use with either a synchronous or asynchronous bus system associated with a host processor, comprising: first terminal means coupled to said bus system for receiving a select signal from said host processor; second terminal means coupled to said bus system; and first means coupled to said second terminal for determining if said bus system is synchronous or asynchronous.

According to a still further aspect of the invention there is provided an interface circuit for interacting with the bus of a microprocessor system, comprising: first terminal means coupled to said bus for receiving a select signal from said microprocessor; second terminal means for receiving an indication as to whether said bus is synchronous or asynchronous; latching means coupled to said second terminal means for generating a first signal if the bus is synchronous and a second signal if said bus is asynchronous; third means coupled to said first and second terminal means and responsive to said second signal for synchronizing said select signal; fourth means coupled to said first terminal means and responsive to said first signal for passing said select signal; and fifth means coupled to said third means for placing an acknowledge signal on said second terminal means after an asynchronous bus operation has been completed.

The above and other objects, features and advantages of the present invention will be more clearly understood from the following detailed description taken in conjunction with the accompanying drawings, in which:

BRIEF DESCRIPTION OF THE DRAWINGS

FIG. 1 is a partial schematic diagram of the inventive interface circuit;

FIGS. 3a–3e are timing diagrams relating to the asynchronous mode of operation.

DESCRIPTION OF THE PREFERRED EMBODIMENT

Figure 2:
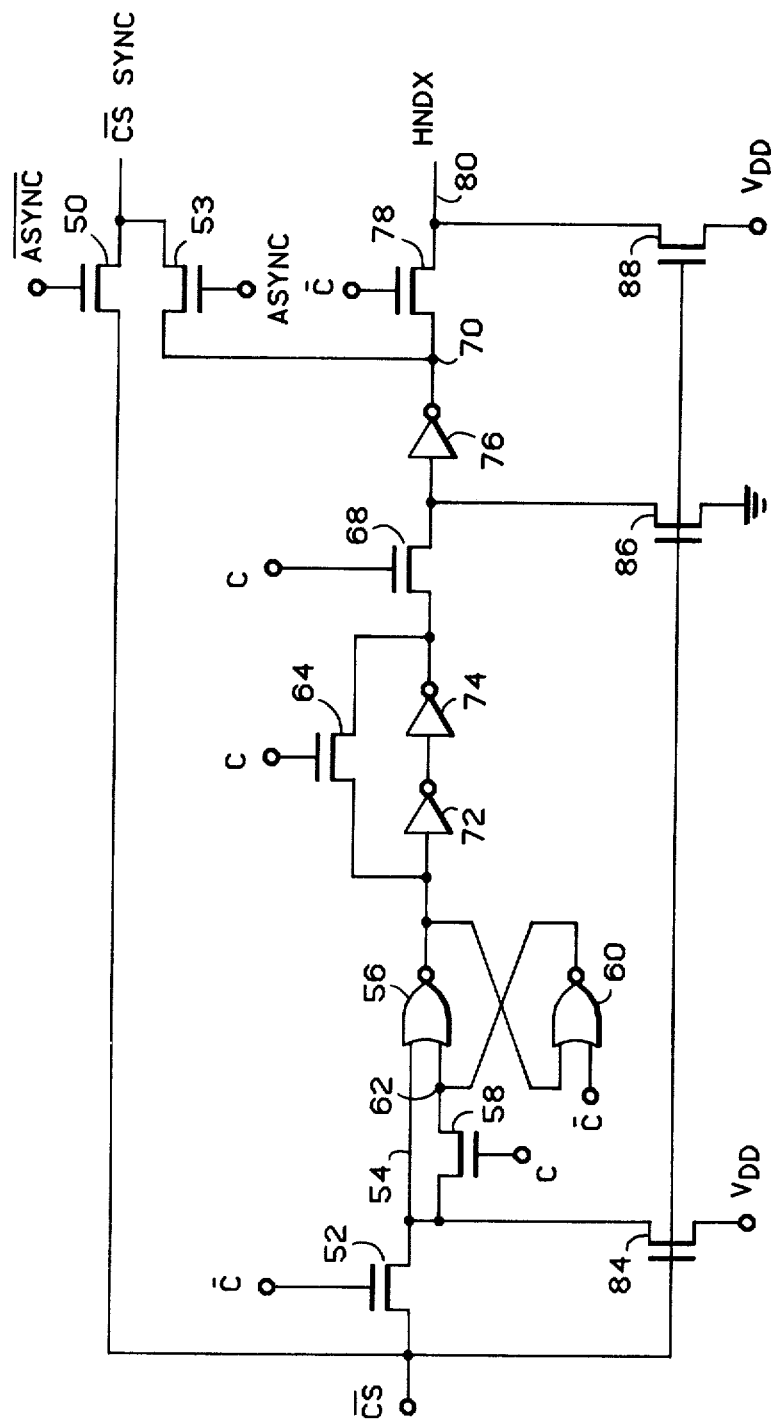
FIG. 2 is a schematic diagram of the control and synchronization logic shown in FIG. 1.

The inventive interface circuit shown in FIGS. 1 and 2 will be described as if they were a part of a peripheral device operating in conjunction with a host processor (not shown). It should be understood, however, that the circuit may be included in equipment other than peripheral devices.

The peripheral utilizes two pins, 2 and 4 labeled $\overline{CS}$ and $\overline{ACK}$ respectively. Terminal 2 is adapted to receive a chip select signal from the host processor, and terminal 4 has placed thereon by the peripheral device a handshake signal at the completion of an operation (e.g. a data transfer). During synchronous operation, $\overline{ACK}$ is grounded by the host processor to inform the peripheral that it is to operate in a synchronous mode. $\overline{CS}$ is a function of the system clock and is driven low by the host processor when the peripheral having the interface circuitry incorporated therein is selected. $\overline{CS}$ is applied via terminal 2, resistor 6, inverter 8 and inverter 10 to control and sync logic 12. As stated previously, $\overline{ACK}$ is grounded during synchronous operation. Prior to $\overline{CS}$ being driven low, a high voltage appeared on the gate of field effect transistor 14 thus applying the low voltage at terminal 4 via resistor 16, inverter 18, inverter 20 and field-effect-transistor 14 to a latch which includes field-effect-transistor 22 and inverters 24 and 26. Thus, a high voltage appears at the $\overline{ASYNC}$ output (the output of inverter 24) of the latch, and a low voltage appears at output $\overline{ASYNC}$ (output of inverter 26) of the latch. When $\overline{CS}$ is finally driven low to select a peripheral, field-effect-transistor 14 is turned off and the voltage at terminal 4 is effectively latched in latch 28.

Referring now to FIG. 2 which illustrates the circuitry in CONTROL AND SYNC LOGIC 12 (FIG. 1), it can be seen that $\overline{CS}$ is supplied to field-effect-transistor 50 which has a gate electrode coupled to $\overline{ASYNC}$. Since $\overline{ASYNC}$ is high, $\overline{CS}$ will pass through field-effect-transistor and is denoted $\overline{CS}_{SYNC}$. The activity of the remainder of the circuit does not affect $\overline{CS}_{SYNC}$ due to the blocking action of field-effect-transistor 53 which has a gate electrode coupled to ASYNC. Since ASYNC is low during synchronous operation, field-effect-transistor 53 remains off.

For a discussion of the asynchronous mode of operation, reference is again made to FIG. 1. The host processor drives $\overline{CS}$ low to signify to the peripheral that an operation is about to begin. When $\overline{CS}$ goes low, field-effect-transistor 14 is turned off, and the state of $\overline{ACK}$ is latched in latch 28. In the asynchronous mode, $\overline{ACK}$ was high when $\overline{CS}$ was driven low; thus, signal ASYNC is high and signal $\overline{ASYNC}$ is low.

Referring now to FIG. 2, when the clock signal goes low ($\overline{C}$ goes high) field-effect-transistor 52 is turned on, thus applying the state of $\overline{CS}$ to a first input 54 of NOR gate 56. When the clock goes high, ($\overline{C}$ goes low), field-effect-transistor 52 is turned off and field-effect-transistor 58 is turned on. In this manner, the first and second inputs of NOR gate 56 are the same (in this case both low). Thus, the output of NOR gate 56 is high. This high signal is applied to a first input of NOR gate 60 which reinforces the low signal at the second input 62 of NOR gate 56. With C high, field effect transistors 64 and 68 are on, thus permitting the signal at the output of NOR gate 56 to pass through inverters 72, 74 and 76 to node 70. Since the output of gate 56 is high, the signal appearing at node 70 will be low. It is to be noted that since signal ASYNC is high, field-effect-transistor 53 is turned on, thus passing the signal which appears at node 70 as $\overline{CS}_{SYNC}$.

During the next occurrence of $\overline{C}$, field-effect-transistor 78 is turned on to pass the signal appearing at node 70, thus producing a low handshake ($\overline{HNDK}$) signal. The handshake signal is applied over line 80 to a first input of NOR gate 42 in FIG. 1. Since at this time both $\overline{CS}$ and $\overline{ASYNC}$ are low, a high voltage appears at the output of NOR gate 42 turning on field effect transistor 82. This will cause node 44 to go to ground and thus pull terminal 4 ($\overline{ACK}$) low. This indicates completion of the transfer operation.

In response to $\overline{ACK}$ going low, the host processor will drive $\overline{CS}$ high again. It should be clear that prior to driving $\overline{CS}$ high, the output of NOR gate 30 is high since both $\overline{CS}$ and $\overline{ASYNC}$ are low. Thus, a high voltage is applied to a first input of NOR gate 38 while a low voltage is applied to the second input of NOR gate 38 since the output of NOR gate 30 is coupled to the second input of NOR gate 38 via inverters 32, 34 and 36. However, when CS goes high, a low will appear at the output of NOR gate 30 and therefore at the first input of NOR gate 38. Due to the propagation delays through inverters 32, 34 and 36, the low voltage appearing at the second input of NOR gate 38 will remain for a period of time corresponding to the propagation delays through inverters 32, 34 and 36 causing a pulse to appear at the output of NOR gate 38. This pulse is applied to the gate of field-effect-transistor 40 turning it on. This in turn causes a pulse to appear at node 44 and therefore at terminal 4 ($\overline{ACK}$). The appearance of this pulse completes the operation. It should be noted that terminal 4 has been pulsed high, but is thereafter tri-stated. An external pull-up resistor (not shown) will hold the terminal high. This allows multiple peripherals to utilize the same bus.

Referring again to FIG. 2, three additional field effect transistors 84, 86 and 88 each having their gate electrode coupled to $\overline{CS}$ are shown. The current conducting paths of transistors 84 and 88 are coupled to a source of supply voltage ($V_{DD}$) while the current conducting path of transistor 86 is coupled to ground. The function of these transistors is to initialize the circuit shown in FIG. 2 when $\overline{CS}$ is high. Thus, during initialization or reset, inputs 54 of NOR gate 56 and line 80 (HNDK) will be forced high while the input of inverter 76 will be forced low.

FIGS. 3A–3E illustrate waveforms which are useful in understanding asynchronous operation as described above. FIGS. 3A and 3B illustrate the clock signals C and $\overline{C}$. In FIG. 3C, $\overline{CS}$ is driven low at time t1 by the host processor to indicate that the peripheral has been selected. It is to be noted that the falling edge of $\overline{CS}$ at time t1 is not coincident nor is it synchronous with either the leading or trailing edges of the clock signal. At time t2 corresponding to the rising edge of $\overline{C}$, the handshake signal goes low and causes $\overline{ACK}$ to go low as is shown in FIG. 3E. In response to this, the host processor will force $\overline{CS}$ high again as is shown at time t3 in FIG. 3C. This terminates the handshake signal and causes $\overline{ACK}$ to be pulsed high. The width of the pulse (t3–t2) corresponds to the propagation delay through inverters 32, 34 and 36 shown in FIG. 1. As is shown in FIG. 3E, after time t4, ACK is tri-stated as described earlier.

The above description is given by way of example only. Changes in form and details may be made by one skilled in the art without departing from the scope of the invention as defined by the appended claims.

We claim:

1. An interface circuit for use in conjunction with a data processing system bus, comprising:
    first means coupled to said bus for receiving a select signal from said data processing system;
    second means for receiving an indication as to whether said bus is synchronous or asynchronous;
    third means coupled to said first means for passing said select signal if said bus is synchronous; and
    fourth means coupled to said first and second means for synchronizing said select signal if said bus is asynchronous.

2. A circuit according to claim 1 further including fifth means coupled to said fourth means for applying an acknowledge signal to said first means to indicate the completion of an asynchronous bus operation.

3. A circuit according to claim 2 wherein said data processing system terminates said select signal in response to said acknowledge signal and wherein said circuit further includes sixth means coupled to said first and second means for pulsing said second means in response to termination of said select signal.

4. A circuit according to claim 3 wherein said second means further includes latching means for storing said indication and for generating a first signal for synchronous bus operation and a second signal for asynchronous bus operation.

5. An interface circuit for interacting with the bus of a microprocessor system, comprising:
    first terminal means coupled to said bus for receiving a select signal from said microprocessor;
    second terminal means coupled to said bus for receiving an indication as to whether said bus is synchronous or asynchronous;
    latching means coupled to said second terminal means for generating a first signal if the bus is synchronous and a second signal if said bus is asynchronous;

third means coupled to said first and second terminal means and responsive to said second signal for synchronizing said select signal;

fourth means coupled to said first terminal means and responsive to said first signal for passing said select signal; and fifth means coupled to said third means for placing an acknowledge signal on said second terminal means after an asynchronous bus operation has been completed.

6. A circuit according to claim 5 wherein said microprocessor terminates said select signal in response to said acknowledge signal and wherein said circuit further includes sixth means coupled to said first and second terminal means for pulsing said second terminal means in response to the termination of said select signal.

7. A circuit according to claim 6 further including reset means coupled to said third and fifth means for initializing said circuit in the absence of said select signal.

* * * * *